March 25, 1930.  G. H. E. DE RAM  1,752,240
SHOCK ABSORBER
Filed Aug. 10, 1926
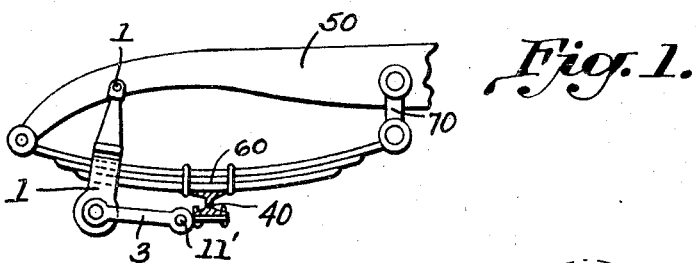
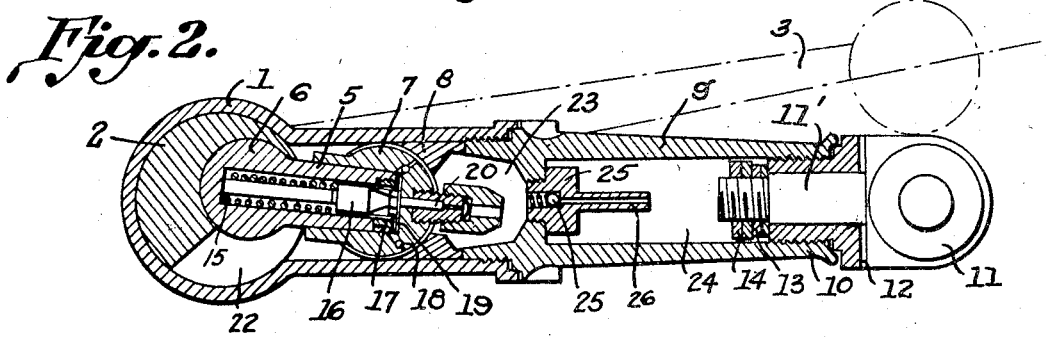
Inventor:
G.H.E. de Ram
by Marks & Clerk
Attys Patented Mar. 25, 1930

1,752,240

UNITED STATES PATENT OFFICE

GEORGES HENRI ERNEST DE RAM, OF BOULOGNE-SUR-SEINE, FRANCE

SHOCK ABSORBER

Application filed August 10, 1926, Serial No. 128,489, and in France August 27, 1925.

The present invention relates to improvements in shock absorbers for motor vehicles and the like, and is characterized by the combination of a friction device and a hydraulic device, so arranged that when combined, efficiently performs the necessary function.

In the accompanying drawing;

Figure 1 is a diagrammatic view of the device showing it in connection with the chassis of a vehicle.

Fig. 2 is a longitudinal sectional view taken on a line perpendicular to the pivot.

Fig. 3 is a plan view partly in section.

Fig. 4 is a sectional view of a modified form.

With reference to Figs. 1, 2 and 3, the aggregate of the apparatus has practically the shape of a pair of compasses, one of the legs of the compass constituting a casing 1, while the other leg constitutes the operating lever 3. In Fig. 1 the lever 3 is fixed on the axle 40 by the joint 11' and the casing 1 is fixed on the chassis 50 at 11, and the suspension comprises a spring 60 attached by one of its ends to the chassis by the links 70.

The device comprises a member 1, having two perpendicular bores, the first bore receiving the control axle 2 on which is keyed the lever 3 by the member 29 in any desired position. The second bore is perpendicular to the first mentioned bore and contains the hydraulic members.

The sleeve may be conical and is clamped by means of a nut at the end of the shaft, and in which case the lever is split and clamping is obtained by means of a tangential bolt, which is of well known construction.

The axle 2 is constantly pressed against the joint 4 by an elastic member 27, as clearly shown in Fig. 3.

A plunger 5 is provided and is equipped with a ball 6 for engagement in the axle 2. This plunger is capable of sliding in the cylinder 7 and is also jointed in the socket 8. The socket 8 is held by the plunger reservoir 9 which is closed by the plug 10 carrying the joint eye 11. Tightness at this point is obtained by the joint 12 and the washers 13 which are retained in place by the nut 14.

The operation is as follows:

The rotation of the axle in the casing 1 causes a displacement of the plunger 5 in the cylinder 7. The plunger 5 is controlled in turn by the spring 15 and the tickler 16. Owing to this motion the liquid contained in the apparatus flows into the inside of the cylinder through the ball valves 18 normally held seated by a leaf spring 19 fixed on the bottom of the cylinder by a screw 20. On the return stroke of the plunger the liquid is forced back by a suitable device (automatic leak such as shown and described in French Patent No. 390,075 dated December 6, 1924).

The liquid obtains access to the valves 18 through grooves provided around the cylinder 7, said grooves also affording communication between the chambers 22 and 23.

Owing to the construction of the ball 6, the shaft 2 is pressed strongly onto its seat owing to the liquid pressure upon the plunger 5. This latter constitutes together with the cylinder 7 the control member of the friction brake, action of which thus varies with the intensity of the shock received by the axle, and is additional to the hydraulic braking action.

The apparatus is completed by supply tank 24 which communicates with the chamber 23 through a valve 25 having associated therewith a tube 26. The bore of the tube is placed substantially at the center of the chamber 24 so as to insure the supply of liquid in all positions of the apparatus, even if the tank should become half empty.

The cylinder may be, if desired, fixed and the plunger may be controlled by a connecting rod operated by pushing or traction, as indicated in Fig. 4.

As the apparatus shown is single acting, it will be noted that by a simple movement of the control lever it can operate indifferently in one direction or the other, or it may also operate in both directions.

Referring to Fig. 4, the cylindrical control axle 2' comprises two sets of balls 30 and 30', and 31 and 31' arranged at the ends of the connecting rods 32 and 32', the latter acting alternately on the two pistons 33 and 33' which move in corresponding cylinders in the body of the apparatus. Ball valves 35 and 35', as well as pull-off springs 36 and 36' are provided, as are automatic leak devices 37 and 37'. A supply reservoir is provided at 34. The operation is identical with that of Fig. 2, but the device acts in two directions alternately when the cylinder 2' turns in one direction, one of the pistons 33 and 33' acts by hydraulic braking, while the other piston is acting when the cylinder 2' turns in the other direction.

I claim:

1. A shock absorber comprising two pivotally connected members, a hydraulic element and a friction element carried by one of said members, the other member constituting the operating lever and associated with said friction element, means for supplying said hydraulic member with a fluid upon the rotation of said friction element, whereby the action of said friction element and said operating lever is automatically controlled.

2. A shock absorber comprising two pivotally connected members, a hydraulic element and a friction element carried by one of said members, the other member constituting the operating lever and associated with said friction element, a fluid reservoir in said member carrying said hydraulic element, an eye joint plug disposed in said reservoir, means for automatically supplying said hydraulic element with fluid upon the rotation of said friction element in one direction from its normal position, and means for automatically returning said fluid to said reservoir on the return of said friction element to its normal position.

3. A shock absorber comprising two pivotally connected members, a hydraulic element and a friction element carried by one of said members, the other member constituting the operating lever and associated with said friction element, a fluid reservoir in said member carrying said hydraulic element, means for automatically supplying said hydraulic element with fluid upon the rotation of said friction element, in one direction from its normal position, and means for automatically returning said fluid to said reservoir on the return of said friction element to its normal position.

4. A shock absorber comprising two pivotally connected members, a hydraulic element and a friction element carried by one of said members, the other member constituting the operating lever and associated with said friction element, resilient tightening means associated with said friction element, a fluid reservoir associated with said member carrying said hydraulic element, an eye joint plug disposed in said fluid reservoir, means for automatically supplying said hydraulic element with fluid upon the rotation of said friction element in one direction from its normal position, and means for automatically returning said fluid to said reservoir on the return of said friction element to its normal position.

In testimony whereof I affix my signature.

GEORGES HENRI ERNEST de RAM.